United States Patent
Cisar et al.

(10) Patent No.: US 11,217,795 B2
(45) Date of Patent: Jan. 4, 2022

(54) DEVICE AND METHOD FOR PRODUCING FLOW FIELD PLATES

(71) Applicant: Schuler Pressen GmbH, Göppingen (DE)

(72) Inventors: Rolf Cisar, Engelthal (DE); Alexander Seitz, Erlangen (DE)

(73) Assignee: SCHULER PRESSEN GMBH, Goppingen (DE)

( * ) Notice: Subject to any disclaimer, the term of this patent is extended or adjusted under 35 U.S.C. 154(b) by 245 days.

(21) Appl. No.: 16/472,615

(22) PCT Filed: Dec. 19, 2017

(86) PCT No.: PCT/EP2017/083587
§ 371 (c)(1),
(2) Date: Jun. 21, 2019

(87) PCT Pub. No.: WO2018/114974
PCT Pub. Date: Jun. 28, 2018

(65) Prior Publication Data
US 2021/0135245 A1    May 6, 2021

(30) Foreign Application Priority Data

Dec. 22, 2016 (DE) .......................... 102016125502.5

(51) Int. Cl.
*H01M 4/00* (2006.01)
*H01M 4/88* (2006.01)
*H01M 8/2404* (2016.01)
*H01M 4/86* (2006.01)

(52) U.S. Cl.
CPC ....... *H01M 4/8896* (2013.01); *H01M 8/2404* (2016.02); *H01M 2004/8694* (2013.01)

(58) Field of Classification Search
CPC ....... H01M 2004/8694; H01M 8/2404; H01M 4/8896; H01M 8/0228; Y02E 60/50
See application file for complete search history.

(56) References Cited

U.S. PATENT DOCUMENTS

| | | | |
|---|---|---|---|
| 2004/0081881 A1 | 4/2004 | Vyas et al. | |
| 2004/0247927 A1* | 12/2004 | Kurz | B23K 11/002 428/608 |
| 2009/0117431 A1 | 5/2009 | Obika et al. | |

FOREIGN PATENT DOCUMENTS

| | | |
|---|---|---|
| DE | 102004050921 A1 | 5/2005 |
| DE | 102004050921 A1 | 5/2005 |
| DE | 102009059765 A1 | 6/2011 |
| DE | 102009059765 A1 | 6/2011 |
| DE | 102010054617 A1 | 6/2012 |
| DE | 102010054617 A1 | 6/2012 |
| DE | 102010056016 A1 | 6/2012 |

(Continued)

*Primary Examiner* — Cynthia H Kelly
*Assistant Examiner* — Monique M Wills
(74) *Attorney, Agent, or Firm* — Hoffmann & Baron, LLP

(57) ABSTRACT

A method and a device for producing bipolar plates for fuel cells. A bipolar plate is formed by joining an anode plate to a cathode plate, wherein the anode plate and the cathode plate are formed by forming a substrate plate.
In order to provide a cost-effective and automated method, it is proposed that a plate already provided with a reactive coating or catalyst coating, which is transported, automatically driven, via a transport device from the forming device to the joining device, is used as substrate plate.

27 Claims, 7 Drawing Sheets

(56) References Cited

FOREIGN PATENT DOCUMENTS

| | | |
|---|---|---|
| DE | 102010056016 A1 | 6/2012 |
| DE | 102014101899 A1 | 8/2015 |
| DE | 102014101899 A1 | 8/2015 |
| JP | 2005183182 A | 7/2005 |
| JP | 2005183182 A | 7/2005 |
| JP | 2009193868 A | 8/2009 |
| JP | 2009193868 A | 8/2009 |
| JP | 2013152941 A | 8/2013 |
| JP | 2013152941 A | 8/2013 |
| JP | 2015141846 A | 8/2015 |
| JP | 2015141846 A | 8/2015 |
| WO | 2017211512 A2 | 12/2017 |
| WO | WO2017211512 A2 | 12/2017 |

* cited by examiner

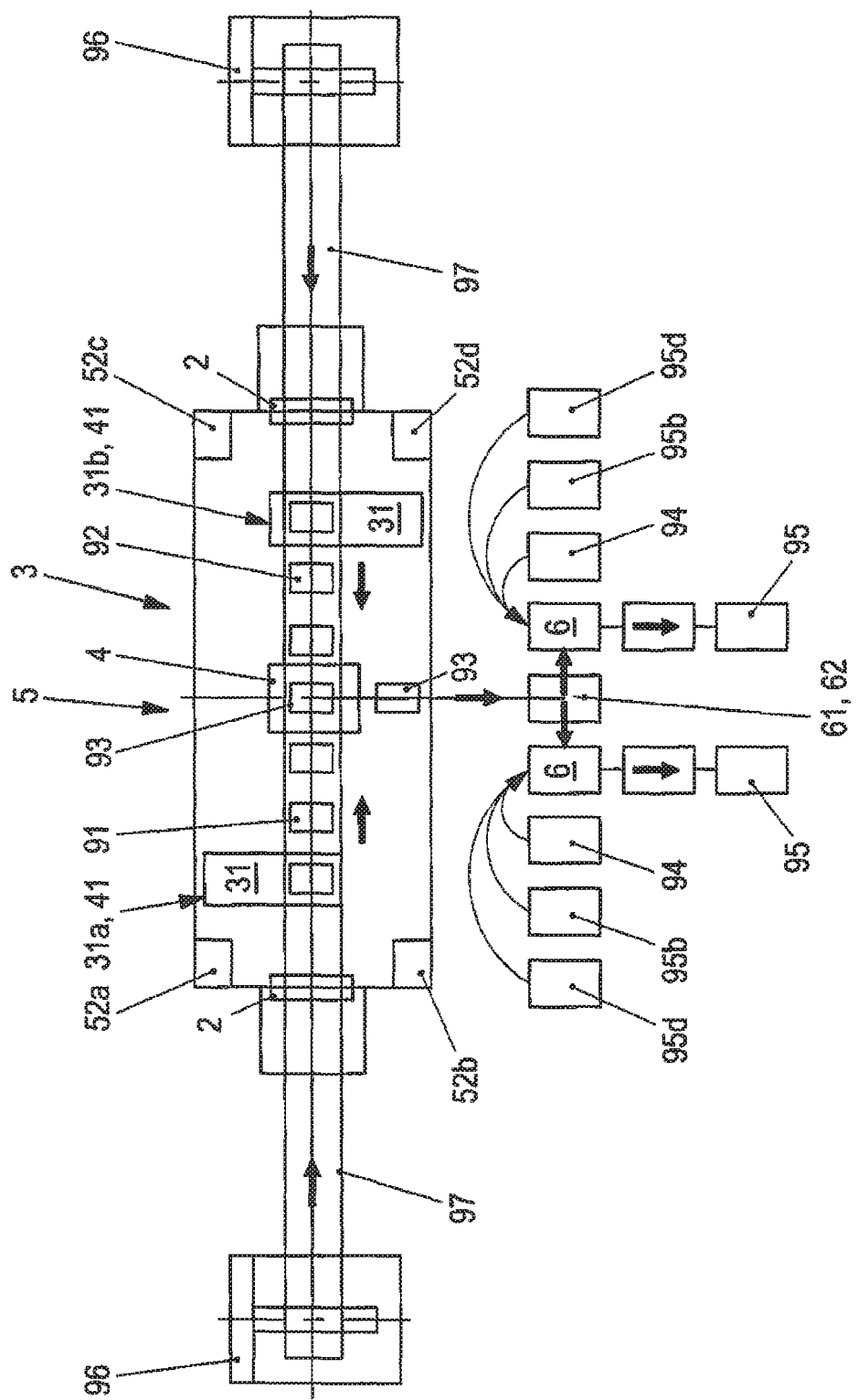

DEVICE AND METHOD FOR PRODUCING FLOW FIELD PLATES

This application claims priority based on an International Application filed under the Patent Cooperation Treaty, PCT/EP2017/083587, filed on Dec. 19, 2017, and German Application No. 102016125502.5, filed on Dec. 22, 2016.

BACKGROUND OF THE INVENTION

The invention relates to a device and a method for producing bipolar plates according to the features of the preamble of claim 1.

Bipolar plates are used in fuel cells. A fuel cell has as power-supplying unit an electrochemical cell, which is composed of an anode, a membrane and a cathode. At the anode hydrogen reacts releasing electrons. The protons forming move from the anode to the cathode. At the cathode the protons react with oxygen, absorbing electrons. Water is formed as reaction product. In order to increase the voltage of a fuel cell, several electrochemical cells are connected in series. This means that they are interconnected electrically in series. Bipolar plates are arranged between the individual cells. They have an anode on one side and a cathode on the other side. They separate the individual cells from each other and conduct the generated current towards the outside. Channels are stamped in the bipolar plates, through which reaction media are fed. Hydrogen or a hydrogen-containing carrier medium is fed to an anode. Oxygen or an oxygen-containing carrier medium is fed to a cathode. The reaction water forming is likewise discharged through channels present in the bipolar plates.

A corresponding device for producing bipolar plates is known from DE 10 2009 059 765 A1. Flat, strip-shaped metal sheets are used as starting material, into which structures, i.e. channels are introduced by forming. After the forming, the individual plates are cut from the strips and subjected to a cleaning step. After the cleaning, the individual plates are then stacked one on top of the other and connected to one another to form a bipolar plate in a laser welding process. The joined plates are then cleaned again and taken to a coating line. In a coating line a catalyst is vapor-deposited in vacuo via a PVD process. This coating forms a reactive layer which on the one hand forms a protection for the plate and on the other hand improves the surface reactivity. After the coating, a process for cleaning the plate is again carried out. Several bipolar plates are then connected to form a fuel cell pile or fuel cell stack. A disadvantage of this known process is that, because of the plurality of processing steps, several machines and correspondingly a large area is required for producing the bipolar plates. A corresponding handling of the plates is necessary between the processing machines. Moreover, the production is complex and requires many manual interventions because of the alternating chemical and mechanical processing steps.

A further method for producing bipolar plates is known from DE 10 2004 050 921 A1. There several separate working stations are provided. In a first working station, a sheet metal strip is subdivided into individual plates via a punching process. The plates furthermore remain connected to a sheet metal strip in that the individual plates have small webs which connect them to the edge area of the sheet metal strip. The sheet metal strip is transported by means of a motor from the processing station 1 to a second working station in which a stamping process is carried out, in order to stamp flow channels or connecting channels into the plates by shaping. The connected sheet metal parts are then guided into a third station in which they are separated from the sheet metal strips. Following the third station the plates are transported to a coating line. In the coating line the individual plates are provided with a coating via a sputtering process. This process also requires several chemical and mechanical processing steps arranged one after the other, which have to be carried out in a plurality of individual working stations. The handling of the individual plates or the necessary cleaning between the working stations makes this production process relatively complex and involves a high space requirement.

DE 10 2014 101 899 A1 reveals a further method for producing bipolar plates in a manufacturing line. In the manufacturing line described in the abstract, a parallel processing of several substrate strips in several layers is effected. The workpieces obtained through the parallel processing are joined to form a bipolar plate in a final working step. During the processing, the manufacturing steps of punching, forming, coating, joining and separating are performed one after the other. Although cleaning steps that are necessary in order to free the substrate strips from undesired residues, for example between the forming and coating steps, are not described in this document, they have to be carried out however in order to obtain a functional bipolar plate. The method described is thus relatively complex.

SUMMARY OF THE INVENTION

The object of the present invention is to provide a device as well as a method for producing bipolar plates which makes a cost-effective production possible and has as small a space requirement as possible. In particular, the method is as far as possible to run in an automated manner. In particular, the necessary manual working steps are to be reduced.

This object is achieved according to the invention by a device for producing bipolar plates for fuel cells with the features of claim 1 as well as a device for producing bipolar plates for fuel cells with the features of claim 11 and by a method for producing bipolar plates for fuel cells with the features of claim 27. The method according to the invention can be carried out in particular using a device according to the invention.

According to the invention the device for producing bipolar plates comprises a conveying device in order to transport individual plates, automatically driven, in a transport direction, wherein the conveying device has a transport beam with at least one workpiece gripper for gripping substrate plates and/or anode plates and/or cathode plates, wherein the transport beam extends from the forming device to the joining device, and a conveying drive device is connected to the transport beam in order to move the workpiece gripper and/or the transport beam, automatically driven, in or against the transport direction, and to move the workpiece gripper and/or the transport beam, automatically driven, in a lifting direction and/or in a clamping direction. The conveying device makes automated transport of both substrate plates and also anode plates and cathode plates possible across several working stations. The automatic drive of the transport beam in at least two, preferably three directions makes automatic handling of the substrate plates possible without manual interventions being necessary. It is thus possible to perform several working steps immediately one after the other without manual interventions being necessary in between. This makes it possible on the one hand to construct compact production devices which have a low space requirement as well as to manufacture the bipolar plates in a fully automated manner and in particular at a high speed.

In an embodiment it is provided that the device for producing bipolar plates for fuel cells comprises a conveying device, a forming device and a joining device, wherein the conveying device transports either substrate material, preferably strip-shaped substrate material, or individual substrate plates or several substrate plates connected to one another, preferably substrate plates connected to form a strip, automatically driven, in a transport direction first to the forming device and then to the joining device, wherein the forming device stamps structures into the substrate plates by means of at least one stamping die or at least one forming die and thereby forms a substrate plate into an anode plate or a cathode plate. Together with the forming of the plates, a substrate plate can preferably also be cut off or partially cut off. The joining device then joins an anode plate and a cathode plate to form a bipolar plate. It is advantageous that a bipolar plate with anode plate and cathode plate can be produced from a single substrate material. The device therefore preferably comprises a substrate magazine which accommodates a single reel or a coil with substrate material and feeds the device.

The conveying device preferably has one or more controlled electric motors which are connected to a control device, in order to make precise and automatic conveying of individual substrate plates possible.

Flat, smooth substrates can be used as substrate plates or as substrate material, which are delivered for example as roll material on a spool or as strip material. In particular substrate material denotes a coated carrier material. This substrate material can be used as a strip wound onto reels or coilers. Individual substrate plates can be cut off from the substrate material, which can be for example a roll material or strip material. For example smooth, strip-shaped metal sheets, preferably stainless-steel sheets or conductive, in particular carbonized plastics can be used as roll material or strip material. A coating is preferably applied to the roll material or strip material used as substrate. It is advantageous for a plate already provided with a reactive coating and/or catalyst coating to be used as substrate plate. The processing step of coating that is usually necessary after forming the substrate can then be dispensed with in the method according to the invention. The cleaning of the substrate plates that is necessary before the coating can also be dispensed with. A drying of the substrate plates that is usually necessary after the coating can also be dispensed with.

To cut off a substrate plate, a separator which cuts individual substrate plates off from the substrate strip can be provided in a transfer area between substrate strip and the conveying device. Shears or a laser cutting device or water jet cutting device or punching device can for example be used as separator.

In an embodiment the substrate plates can be completely separated from the substrate strip by the separator and transported further individually. In another embodiment the substrate plates can be separated by the separator such that the substrate plates continue to be connected to the substrate strip by means of residual webs and are transported further as a continuous strip. The separator can preferably either be formed separately or be formed integrated in a forming die, for example the anode die or cathode die. In particular the forming of a substrate plate to form an anode plate or cathode plate can be effected in one working step at the same time as the complete or partial cutting off of a plate from the substrate material.

The conveying device can have a roller transport device or an eddy current transport device for transporting substrate material, such as for example roll material or strip material. In addition, the conveying device can have a roller transport device or an eddy current transport device for transporting substrate plates and/or anode plates and/or cathode plates.

A roller transport device has a driven roller, which interacts with the strip material to be transported or the plate (substrate plate and/or anode plate and/or cathode plate) to be transported in order to transport it. Two rollers can also be provided between which the substrate material to be transported or the plates to be transported are guided.

An eddy current transport device is used in particular in the case of relatively thin strip material or in the case of thin plates. The transport of the substrate material or the plates is effected via the interaction between eddy currents indicated in the substrate material or in the plates (substrate plate and/or anode plate and/or cathode plate) and a magnetic field.

The structures stamped into the substrate plates by means of the forming device form channels and/or recesses in the bipolar plate, through which reaction media, i.e. hydrogen-carrying media or oxygen-carrying media, can be channeled. Furthermore, the structures can form channels which make it possible to discharge the reaction product forming, in particular water, from the bipolar plate. Furthermore, the structures can comprise channels in order to channel a cooling medium or heating medium through the bipolar plate. This makes it possible to keep the finished fuel cell at a particular operating temperature. For example, the forming and/or stamping of the substrate plates can be carried out in a pressing device or a rolling device.

In a preferred embodiment the transport beam of the conveying device can be formed of a profile material, such as for example a metal profile that can be cut to length. The transport beam can also be used as a transport rail. It has a carrying function and transports the individual plates, i.e. a substrate plate and/or an anode plate and/or a cathode plate, held by the workpiece grippers. The workpiece grippers are formed as controllable grippers for the individual plates. This means that the workpiece grippers are formed for gripping both a substrate plate and also an anode plate and a cathode plate. For example, the workpiece grippers can receive the individual plates mechanically, preferably via controlled claws. Alternatively it is also possible for the workpiece grippers to receive, i.e. hold on to individual plates by means of a vacuum. It is also conceivable that the workpiece grippers receive or hold the individual plates magnetically, in particular via a controlled electromagnet.

In an embodiment according to the invention it is provided that the forming device has one or more stamping dies. As a first stamping die or forming die, the forming device can have one anode die or several anode dies for forming anode plates. Spaced apart therefrom in the transport direction, the forming device can have, as a further stamping die or forming die, a cathode die or several cathode dies for forming cathode plates. It is in particular provided that the several anode dies are arranged directly one behind the other. Correspondingly, several cathode dies are preferably also arranged directly one behind the other. In the case of a multi-step forming process, this arrangement also makes possible short paths and thus short transport times of the plates between the individual forming stations, as the processing of an anode plate is effected in dies arranged directly one behind the other and also the processing of a cathode plate is effected in dies arranged directly one behind the other. The joining device is arranged between an anode die and a cathode die, thus arranged, as it were, in the middle.

The conveying device conveys the anode plates and cathode plates in the opposite direction to each other, seen in the transport direction, and in each case transports one anode plate and one cathode plate towards the joining device. Arranging the joining device between an anode die and a cathode die results in an advantageous reduction in the installation space needed, as this production line can be loaded, as it were, from both ends with raw material, i.e. with substrate plates.

For example in an embodiment with a substrate feed from both sides, the device comprises, in particular at each end, a substrate magazine which in each case accommodates a single reel or a single coil with substrate material and feeds the device. This means that the substrate material is fed to the device starting from two sides and conveyed in opposite directions.

It is advantageous that the transport of substrate material can be effected in a single layer. Irrespective of whether substrate material is fed from one side or from two sides, the substrate material is conveyed in only one layer. This simplifies the handling of the substrate material and reduces the space requirement needed for the device according to the invention compared to devices in which the substrate is conveyed in multiple layers.

An advantageous basic idea of the invention is that, in the production of bipolar plates for fuel cells, a bipolar plate is formed by joining an anode plate to a cathode plate and before the joining an anode plate and a cathode plate are formed from a substrate plate by forming or stamping structures. According to the invention it is provided that a plate already provided with a reactive coating and/or catalyst coating is used as substrate plate. This makes it possible to produce the bipolar plates without having to carry out alternating mechanical processing steps and chemical processing steps. The number of processing steps required is significantly reduced and laborious cleaning processes between the individual working steps can be dispensed with.

It is preferably provided that the forming and/or stamping of the substrate plates is carried out in a pressing device or a rolling device. The pressing device can be formed as a vertical press or as a horizontal press. In particular, the forming device can be formed as part of a pressing device.

In an embodiment example, the pressing device can have vertical press uprights and a bolster plate and the transport beam can run parallel to a long side of the bolster plate. For example, it can be provided that the forming device is formed as part of a pressing device, wherein the pressing device has vertical press uprights and a bolster plate arranged between the press uprights, and the transport beam runs parallel to a long side of the bolster plate. In order to achieve a compact design, the press uprights can for example be connected to one another by a press cross member. For example, press rams as well as the drives for the press rams are arranged on the press cross member.

In an embodiment it can be provided that the pressing device has a first press ram which interacts with an anode die, and has a second press ram which interacts with a cathode die. For example, the anode die can be formed in two parts, wherein a first part of the anode die is arranged on the bolster plate and the second part of the anode die is connected to a press ram. A substrate plate is arranged between the two die parts by the conveying device and the two die parts are pressed together via the press ram and the substrate plate is formed thereby. The cathode die is constructed analogously. The anode die can be formed separate from the cathode die. This means that the press has two different press rams, wherein one press ram is connected to the anode die and another press ram is connected to the cathode die.

In an alternative embodiment, one press ram can be connected both to an anode die and to a cathode die, with the result that two substrate plates are processed with a single forming step and thus an anode plate and a cathode plate are formed simultaneously.

In particular, it is provided that after the forming or stamping an anode plate and a cathode plate are transported, automatically driven, to a joining device and there are joined to form a bipolar plate. It can be provided that, for the joining of the bipolar plate, a cathode plate is placed on an anode plate or an anode plate is placed on a cathode plate by means of the conveying device in the area of the joining device, in that first a cathode plate or an anode plate is inserted into a holder of the joining device by the conveying device and then the conveying device moves an anode plate or a cathode plate to at least partially overlap the inserted cathode plate or anode plate and then deposits it on the inserted cathode plate or anode plate.

It is advantageous that, in particular after the working step of forming or stamping, the anode plate and/or the cathode plate is not coated with a reactive coating or a catalyst coating. Preferably, after the step of joining an anode plate to a cathode plate to form a bipolar plate, it is also not necessary to coat the bipolar plate with a reactive coating or a catalyst coating. This is achieved in that an already coated substrate material is used. A suitable coating has a high resistance to corrosion and/or a high electrical conductivity. The coating can for example contain one or more of the following materials: gold, platinum, silver, titanium carbides or titanium nitrides, $Ti_3SiC_2$, chromium, carbon or nickel. The function of the electrode of an anode plate or cathode plate is preferably borne by the reactive coating or the catalyst coating of the substrate plates.

Alternatively, a substrate material which requires no coating can also be used.

In an embodiment it can in particular be provided that the conveying device has at least two transport beams running parallel to each other in the transport direction, wherein each transport beam has at least one workpiece gripper for gripping substrate plates and/or anode plates and/or cathode plates. If the conveying device has a single transport beam or transport rail running in the transport direction, it can be used to transport substrate plates and/or anode plates and/or cathode plates in a line. If the plates have larger dimensions, it may be advantageous for the conveying device to have two transport beams or transport rails running parallel to each other. Via the workpiece grippers of these two transport beams the plates can then be gripped from both sides in order to prevent them from deforming during the transport. Alternatively, it can also be provided that each of the transport beams or transport rails grips a separate plate in order to form two parallel manufacturing lines with a single conveying device.

In an embodiment it can be provided that the transport beam is mounted at or on a clamping box, wherein the clamping box has a lifting drive in order to drive the transport beam in a lifting direction and/or has a clamping drive in order to drive the transport beam in a clamping direction and/or has a longitudinal drive in order to drive the transport beam in the transport direction. The clamping box can for example have a supporting frame on which a lifting drive and/or a clamping drive is supported. The lifting drive and/or the clamping drive can comprise a servo motor and/or stepper motor, or comprise several servo motors and/or stepper motors, in order to drive the transport beam. Lifting direction in this context means that the transport beam is driven in the vertical direction, i.e. upwards and/or downwards. Transport direction means that the transport beam is moved, driven, in the transport direction or also against the transport direction. The transport direction runs substantially in a horizontal direction. Clamping direction in this context means that the transport beam is driven in the horizontal direction, transverse to the transport direction. The clamping direction comprises both directions. In the case of two parallel transport beams, a transport in the clamping direction means that the two transport beams are moved towards each other. Against the clamping direction means that the two transport beams are moved away from each other.

In an alternative embodiment it can be provided that the conveying device is formed to drive the transport beams in the lifting and/or clamping direction such that the transport beam is mounted in the area of its ends on a vertical press upright via a lifting carriage driven by a lifting drive so as to be slidable in the vertical direction, and the lifting carriage pivots an end of a rocker arm the other end of which is connected to the supporting beam. It is provided that a lifting movement of the transport beams is effected in that the lifting carriages are moved in the vertical direction via lifting drives in the press uprights. A clamping movement of the transport beams can be effected in that the lifting carriages actuate the rocker arm by means of a rotary drive and the lifting drive and the rotary drive are simultaneously actuated such that the transport beam is moved in a horizontal direction by the rotary drive and the vertical movement of the transport beam caused by the rotary movement is simultaneously compensated for by the lifting drive. This makes it possible for a clamping movement to be performed without moving the transport beam vertically in the process.

For a flexible construction and/or simple maintenance it can be provided that the workpiece grippers are removably secured on the transport beam or a carriage of the transport beam.

In order to enable a flexible control, in an embodiment it can be provided that at least two movable transport carriages are mounted on a transport beam, wherein each of these two transport carriages secures a workpiece gripper and has its own drive device in order to move this transport carriage, independently of other transport carriages, along the transport beam. The plates can be transported on the transport beam via the individually driven transport carriages, both in the transport direction and against the transport direction. This means that the plates can be transported independently of a longitudinal drive of the transport beam in or against the transport direction. In an embodiment this makes it possible for one drive of the transport beam in the transport direction to be dispensed with, in order for example to design the device in a more cost-effective manner. In an alternative design, both the transport beam and the transport carriages movably mounted on the transport beam can be driven in the transport direction. This makes a significantly increased speed possible during transport of the individual plates as well as a higher flexibility in the control thereof.

Through the individual actuation of individual transport carriages, individual plates, each with their own movement profile, can be transported at the same time with the transport device. A movement profile can comprise different parameters, such as for example speeds and/or accelerations and/or time-dependent changes in speed and/or times or transport times and/or dwell times and/or stroke lengths and/or transport distances. It is thus possible for substrate plates and anode plates and cathode plates to be transported through various working stations simultaneously with one and the same conveying device on one and the same transport beam. Through the individual control it is possible to allow for the individual requirements of the individual working stations on the processing steps with one and the same transport beam. Thus both the dwell time in the forming device and the dwell time in the joining device can be controlled individually. This makes it possible, for example, for an anode plate to be stationary in the anode die while a substrate plate is already being transported in the direction of the anode die. Moreover, the individual actuation of individual transport carriages makes it possible, for example, for an anode plate and a cathode plate to be transported towards each other in opposite directions.

In an embodiment it can be provided that a workpiece gripper is movably mounted on a transport carriage, driven in the lifting direction, in that the transport carriage has a vertical drive for raising and/or lowering the workpiece gripper. The transport carriage has a vertical drive which can comprise a servo motor and/or a stepper motor and/or a linear drive, in order to raise or lower the workpiece gripper. This drive of the workpiece gripper can be effected in addition to a lifting drive of the transport carriage. This offers the advantage that the plates can be transported on one and the same transport beam with different vertical heights, i.e. in several planes at a horizontal distance from one another. This makes it possible, for example, for an anode plate and a cathode plate to be stacked one on top of the other in the joining device.

For example, in an embodiment it can be provided that the conveying control device actuates the conveying device with a movement profile such that the conveying device, in the area of the joining device, places a cathode plate on an anode plate or places an anode plate on a cathode plate by actuating the transport beam and/or a workpiece gripper such that the latter first inserts a cathode plate or an anode plate into a holder of the joining device and then an anode plate or a cathode plate is raised in the lifting direction by the transport beam and/or a further workpiece gripper, moved to at least partially overlap the inserted cathode plate or anode plate and positioned on the inserted cathode plate or anode plate by lowering the transport beam and/or the further workpiece gripper.

In order to provide a flexible control of the conveying device, the conveying device can have a conveying control device or be connected to a conveying control device, wherein the conveying control device controls the transport beam and/or a workpiece gripper, in particular the conveying control device can determine a movement profile of the transport beam and/or of a workpiece gripper. The conveying control device can, for example, be integrated into a press control system or be formed as a separate conveying control device. In particular, the conveying control device can control the conveying device from a central machine site, in that a digital bus system, in particular a CAN bus or a fieldbus, is provided between the conveying control device and the conveying device.

It can further be provided that the drive device of the transport carriages is connected to a carriage control device and the carriage control device is formed to actuate an individual transport carriage and/or an individual workpiece gripper, preferably that the carriage control device is connected to the conveying control device or is formed integrated into it.

In order to make it possible to transport the plates in opposite directions, in an embodiment it can be provided that the conveying device has two transport belts which are in each case guided over two deflection rollers and driven in opposite directions, wherein one of the transport belts transports the anode plates and the other of the transport belts transports the cathode plates.

In an alternative embodiment it can be provided that the plates are transported in opposite directions in that the conveying device has a transport beam with at least one die gripper for gripping substrate plates and/or anode plates and/or cathode plates, wherein the transport beam extends from the anode die to the cathode die and has a conveying drive in order to move the transport beam and/or the workpiece gripper, automatically driven, in or against the transport direction, and to move the workpiece gripper and/or the transport beam, automatically driven, in a lifting direction and/or in a clamping direction. A transport in opposite directions with only one driven die gripper or only one driven transport beam can be realized in that successively first one plate is transported in the transport direction and then a second plate is transported against the transport direction.

The joining of the anode plate to the cathode plate can be effected by providing that the joining device is a welding device, in particular a laser welding device or an electrode welding device or a plasma welding device. A mechanical joining, for example by seaming, can also be provided.

The joining of anode plate to cathode plate can be effected as a complete joining. This means that the joining device produces all the necessary connections between anode plate and cathode plate. Alternatively, the joining device can produce only some of the necessary connections between anode plate and cathode plate, thus can partially join the plates. The remaining connections can then be effected in a later working step, for example together with the stacking of the bipolar plates.

In order to form bipolar piles or bipolar stacks or fuel cell stacks from the individual manufactured bipolar plates, it can be provided that the joining device transfers a bipolar plate to a further transport device, which conveys the bipolar plate transverse to the transport direction and feeds it to a stacking device. A bottom piece and a cover piece as well as membranes and bipolar plates are fed to the stacking device. The stacking device firstly provides a fuel cell stack with a bottom piece and stacks bipolar plates and membranes alternately thereon. Finally, the stacking device provides the fuel cell stack with a cover piece and screws the latter to the base plate. The finished bipolar plate stack or fuel cell stack can then be removed from the stacking device. By membrane is preferably meant a membrane made of a material which serves as an electrolyte membrane.

It is particularly advantageous that, in the production method according to the invention or in the device according to the invention, a manual handling step need not be effected between the feeding of the substrate material and the removal of the finished bipolar plate stack or fuel cell stack, rather that the handling of the bipolar plates runs in a fully automated manner starting from the substrate material through to the bipolar plate stack.

In an embodiment it can be provided that the further transport of the bipolar plates to the joining device is effected by providing that the further transport device has a transverse transport belt which is guided rotating via two deflection rollers. Alternatively it can also be provided that the further transport device has a driven conveyor arm with a workpiece gripper. For example, the conveyor arm can be formed as a robot arm with several driven pivots.

In order to increase the manufacturing throughput, in an embodiment it can be provided that the stacking device alternately stacks a bipolar plate and a membrane on a fuel cell stack and simultaneously forms two fuel cell stacks, in that the stacking device has a deflector in order to feed a bipolar plate to either a first fuel cell stack or a second fuel cell stack. The stacking device can form the fuel cell stacks one after the other, in that first one stack is filled with bipolar plates, before the second stack is then subsequently filled with bipolar plates. This makes it possible for a finished stack to be removed and a new stack to be prepared by inserting a base plate while the other stack is constructed. Alternatively, the stacking device can fill both stacks with bipolar plates synchronously.

It has been shown that the necessary space requirement can be reduced by arranging the deflector at the side next to the conveying device at the level of the joining device.

The deflector can, for example, comprise a conveyor belt, the transport direction of which is controllable. For example, in order to feed a bipolar plate to the first bipolar plate stack, a first transport direction of the conveyor belt can be activated. In order to feed a bipolar plate to the second bipolar plate stack, the second, opposite, transport direction of the conveyor belt can be activated.

In an alternative embodiment, the deflector can also have a linear carriage. The linear carriage grips a bipolar plate via a corresponding gripper, raises it and transports it in a first direction, in order to feed it to the first bipolar plate stack and deposit it there. In order to feed a bipolar plate to the second bipolar plate stack, the linear carriage transports the bipolar plate in the opposite second direction and deposits the bipolar plate on the second stack.

A further-improved utilization of installation space results by providing in an embodiment that the first bipolar plate stack or fuel cell stack is arranged at the side next to the conveying device at the level of the anode die, and the second bipolar plate stack or fuel cell stack is arranged at the side next to the conveying device at the level of the cathode die.

An increase in productivity can further be achieved by providing in an embodiment that two roll magazines with substrate rolls are arranged in front of and behind the conveying device in the transport direction, wherein the first roll magazine supplies substrate strip to the conveying device in the transport direction, and the second roll magazine supplies substrate strip to the conveying device against the transport direction. It is preferably provided that the substrate strips are formed as metal strips which have a reactive coating and/or a catalyst coating.

A use of the device according to the invention is in particular envisaged in the production of fuel cells for the automobile industry. The device according to the invention can advantageously also be used in the production of fuel cells for combined heat and power plants, as are required in supplying individual buildings. In particular, it is provided that the method according to the invention is carried out using the device according to the invention.

BRIEF DESCRIPTION OF THE DRAWINGS

Embodiment examples of the invention are described in the figures and the following description of the figures. There are shown in:

FIG. 7: a further embodiment example of the invention with substrate feed from both sides.

DETAILED DESCRIPTION OF THE INVENTION

FIGS. 1 to 7 show different designs of the device according to the invention for producing bipolar plates for fuel cells. The designs of the individual embodiments substantially correspond. Reference is specifically made in the description of the figures to differences between the individual embodiments. Identical components are in each case provided with identical reference numbers.

Figure 1:
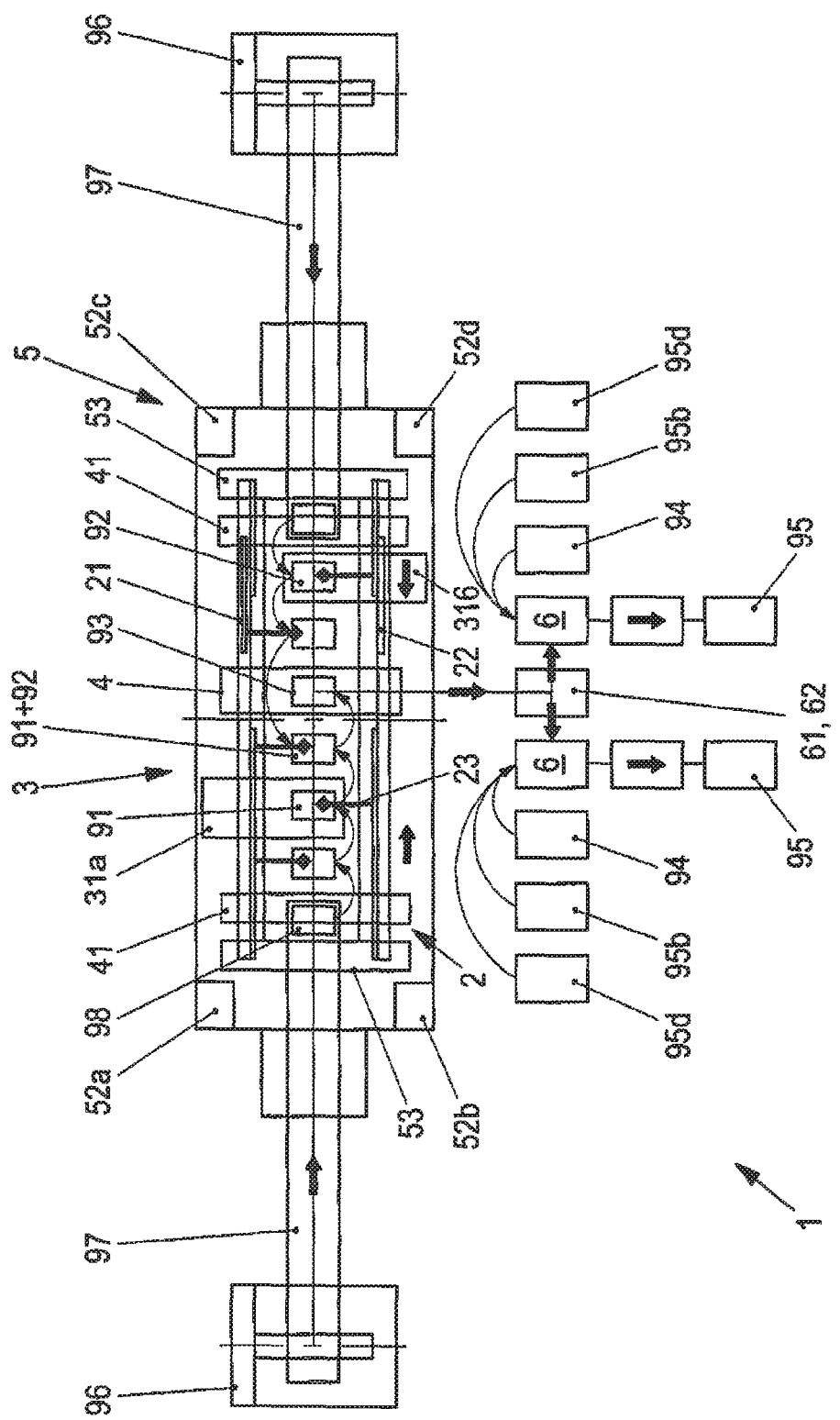
FIG. 1: a first embodiment example of the invention with substrate feed from both sides.

In FIG. 1, a first embodiment example of the device 1 according to the invention for producing bipolar plates is represented. The device 1 has a conveying device 2, a forming device 3 and a joining device 4. The conveying device 2 conveys substrate plates 98, automatically driven, in or against the transport direction represented by arrows. The substrate plates 98 are cut off from a substrate strip 97 by means of a separator 41. The substrate strip 97 is supplied in the form of roll magazines or coilers 96 and fed from both sides to the device 1 for producing bipolar plates.

A pressing device 5 is a centrally arranged element of the device 1 for producing bipolar plates for fuel cells. Both the joining device 4 and also the conveying device 2 and the forming device 3 are secured on the pressing device 5. Optionally, the separator 41 for cutting off individual substrate plate 98 from substrate strips 97 is also arranged on the pressing device 5. The pressing device 5 has a bolster plate 51, which is delimited laterally by four vertically arranged press uprights 52a, 52b, 52c, 52d. The vertical press uprights 52a-d stand on a press stand at the base and are connected to one another in their upper area by a press cross member. The press cross member carries the press rams of the pressing device 5.

The forming device 3 has stamping dies 31, in particular an anode die 31a and a cathode die 31b. Both the anode die 31a and the cathode die 31b are in each case connected to a press ram. The dies are in two parts, wherein a first part is in each case connected to the press ram and a second part of the stamping die is arranged on the bolster plate. To form a substrate plate into an anode plate, it is transported by the conveying device 2 to the anode die. A forming process in order to form the substrate plate 98 into an anode plate 91 is then effected by means of the pressing device 5 or the anode die 31a. In this forming process, structures are stamped into the plate which on the one hand serve channels for feeding or discharging reaction media and also increase the mechanical strength of the anode plate. The anode die 31a is arranged on the top side of the pressing device in FIG. 1. The cathode die 31b is arranged on the underside in the area of the press line represented in FIG. 1. Correspondingly, the forming of the substrate plate 98 into a cathode plate 92 is effected via the cathode die 31b.

The process for forming a substrate plate 98 into an anode plate 91 or a cathode plate 92 can be effected in one step, as described above. Alternatively, it can also be provided that the forming process is effected in several steps, in particular three steps. The conveying device 2 conveys the plates 98 from one forming step to the subsequent forming step. In a first step, the substrate plate 98 can be cut off from a substrate strip 97. Simultaneously with the cutting off, openings or holes can be punched into the substrate plate. In a second step, the substrate plate can be pre-formed in that, for example, first structures or channels are stamped into the substrate plate 98. In a third forming process, the surface of the substrate plate 98 can be gaged, with the result that the final anode plate 91 or cathode plate 92 is produced. It is provided that the respective forming die is formed in several parts corresponding to the number of steps. Thus the anode die 31a and/or cathode die 31b can be in three parts corresponding to the three consecutive forming steps.

The formed substrate plates, i.e. the anode plate 91 and the cathode plate 92 are transported in the opposite direction to each other by the conveying device 2. In FIG. 1, the transport paths of the individual plates are represented by means of curved lines.

The joining device 4 is arranged approximately in the middle area of the pressing device. The anode plate supplied from one side is transported by the conveying device 2 into the area of the joining device 4. Likewise, the cathode plate 92 transported in the opposite direction, i.e. from the other side of the pressing device, by the conveying device is transported into the area of the joining device 4 and made to overlap with the anode plate 91 there. The joining device 4 welds the anode plate 91 to the cathode plate 92 to form a bipolar plate 93.

The finished joined bipolar plate 93 is unloaded from the pressing device 5 at the side (as represented by an arrow in FIG. 1) and transported to a deflector 61. The deflector 61 is formed as a transverse transport belt 62 and transports the bipolar plate 93 either to the upper stacking device 6 represented in FIG. 1 or to the lower stacking device 6. The stacking device 6 in each case comprises a feeding device for a cover plate 95d as well as a feeding device for a base plate 95b and a feeding device for a membrane 94.

In the stacking device 6, a fuel cell stack 95 is formed as follows:

Firstly, a base plate 95b is used as a base for the fuel cell stack. Bipolar plates 93 and membranes 94 are alternately stacked thereon. Finally, the stacking device 6 stacks a cover plate 95d on the stack and connects the base plate 95b to the cover plate 95d, for example by means of screws. The finished fuel cell stack 95 is transported away in the direction of the arrow by the stacking device 6 and can be removed at the removal station as a finished fuel cell stack 95.

The stacking device 6 is arranged at the side directly adjacent to the pressing device 5. This enables a spatially compact construction of the device 1 for producing bipolar plates for fuel cells. It is also advantageous if the feeding devices of the stacking device 6 are arranged one behind the other in the longitudinal direction in order, as represented in FIG. 1, to align themselves with the longitudinal extent of the pressing device 5. In order to increase the output of the device 1 for producing bipolar plates, it is provided as shown in FIG. 1 that one pressing device 5 supplies two stacking devices. Via the deflector 61 the finished bipolar plates 93 are fed alternately to the first stacking device and the second stacking device 6.

The conveying device 2 comprises a first transport beam 21 and a second transport beam 22. The transport beams run parallel to and at a distance from each other in the transport direction. They are arranged within the pressing device 5 and extend in the longitudinal direction substantially over the entire longitudinal extent of the pressing device 5. This means that both the first transport beam 21 and the second transport beam 22 extend substantially from the entry gate of the pressing device 5 formed by the vertical press uprights 52*a* and 52*b* to the exit gate of the press uprights 5 formed by the vertical press uprights 52*c* and 52*d*. The transport beams 21 and 22 are in each case mounted on a clamping box 53 in the area of their ends on both sides. The clamping box 53 has a lifting drive in order to be able to raise or lower the transport beams 21 and 22 in the vertical direction. Furthermore, the clamping box 53 has a clamping drive in order to move the transport beams 21 and 22 in the clamping direction, i.e. in a horizontal direction towards each other or away from each other. Likewise, the clamping box 53 can have a longitudinal drive in order to move one transport beam 21 or both transport beams 21 and 22 in the transport direction. Several workpiece grippers 23 are arranged on each of the transport beams 21 and 22. The workpiece grippers 23 serve to grip and hold on to the plates, i.e. both the substrate plates 98 and also the anode plates 91 and the cathode plates 92 and the bipolar plates 93. The workpiece grippers 93 are individually actuatable, i.e. can be controlled via a control device whether a particular workpiece gripper is gripping or depositing a plate. The workpiece grippers 23 are removably secured on the transport beams 21 and 22 via transport carriages 24 (as represented for example in FIG. 4). This means that the workpiece grippers 23 can be replaced, for example for the purposes of maintenance or a modification of the device 1 for producing bipolar plates.

Each transport carriage with the workpiece gripper 23 secured thereon is individually actuatable via a control device. This means that a transport carriage 24 has a drive in order to move the transport carriage along the transport beam 21 or 22 in the transport direction or against the transport direction. Through the individual actuation of each transport carriage it is possible to transport each individual plate, which is located in the pressing device 5, according to an individual movement profile. This movement profile comprises, for example, speeds and/or accelerations and/or dwell times and/or processing times.

Figure 2:
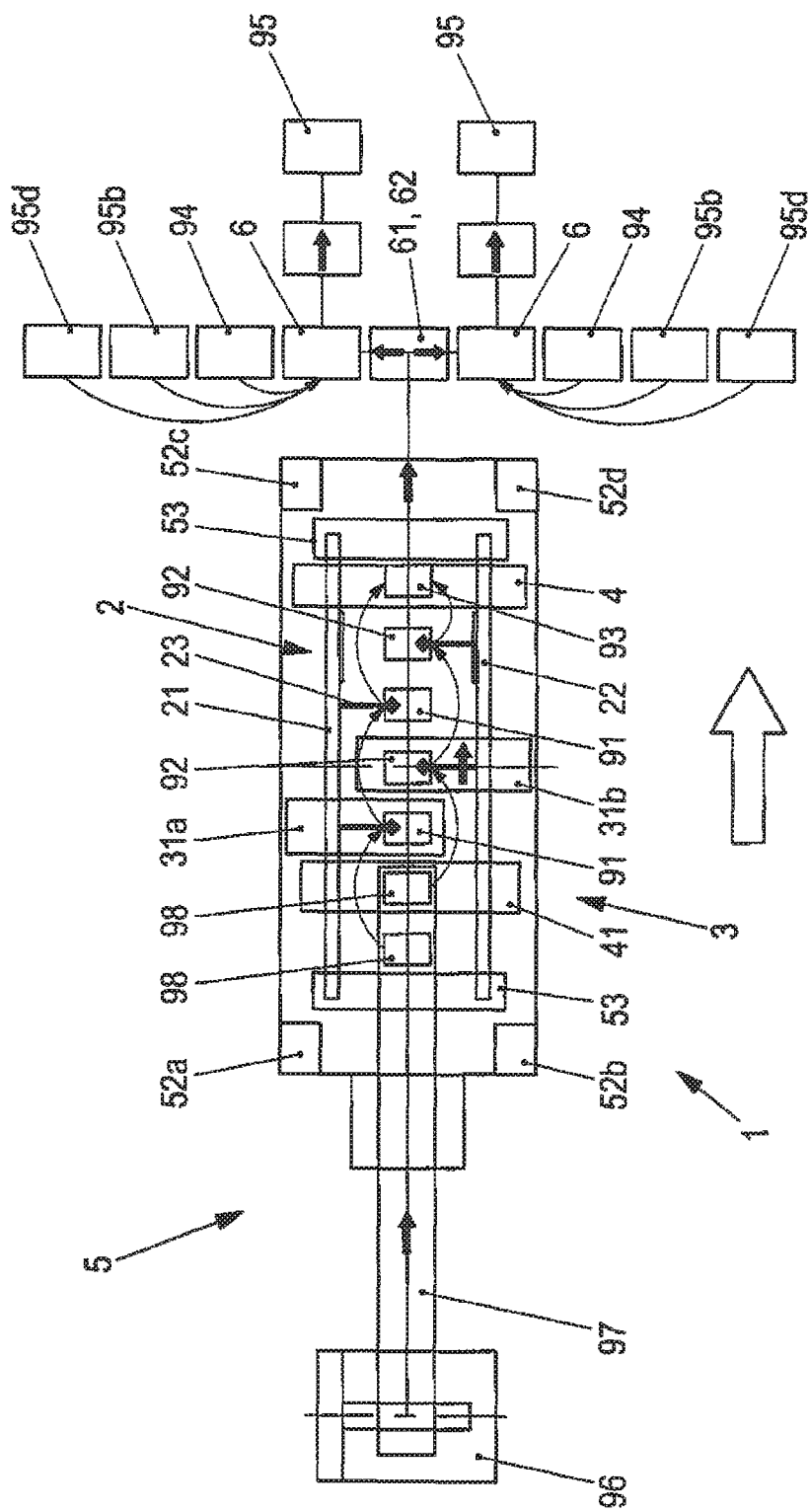
FIG. 2: a second embodiment example of the invention with a substrate feed from one side.

A variant of the device 1 for producing bipolar plates for fuel cells is represented in FIG. 2. In contrast to the device 1 represented in FIG. 1, in FIG. 2 the pressing device 5 is loaded with substrate strip 97 only from one side. This means that the pressing device 5 has only one roll magazine 96 with substrate rolls, in order to supply substrate plates 98. The pressing device 5 has a separator 41 for cutting individual substrate plates 98 off from the substrate strip 97, and stamping dies, arranged one behind the other in the transport direction. The anode die 31*a* follows the separator 41 as stamping die. The cathode die 31*b* follows the anode die in the transport direction. In the end area of the pressing device 5 the joining device 4 is arranged, in order to weld an anode plate 91 to a cathode plate 92. The joining device 4 can comprise a laser welding device and/or a resistance welding device. The joined bipolar plates 93 are unloaded from the pressing device in the transport direction and fed in analogous manner, as in FIG. 1, to a stacking device.

In contrast to the device 1 represented in FIG. 1, here the transport of anode plates and cathode plates is effected simultaneously in the transport direction. Anode plates 91 and cathode plates 92 are arranged alternately one behind the other in a line. In order to join an anode plate 91 to a cathode plate 92, the conveying device 2 alternately conveys an anode plate 91 and a cathode plate 92 to the joining device 4, as can be learned from the representation of the transport lines in FIG. 2.

Figure 3:
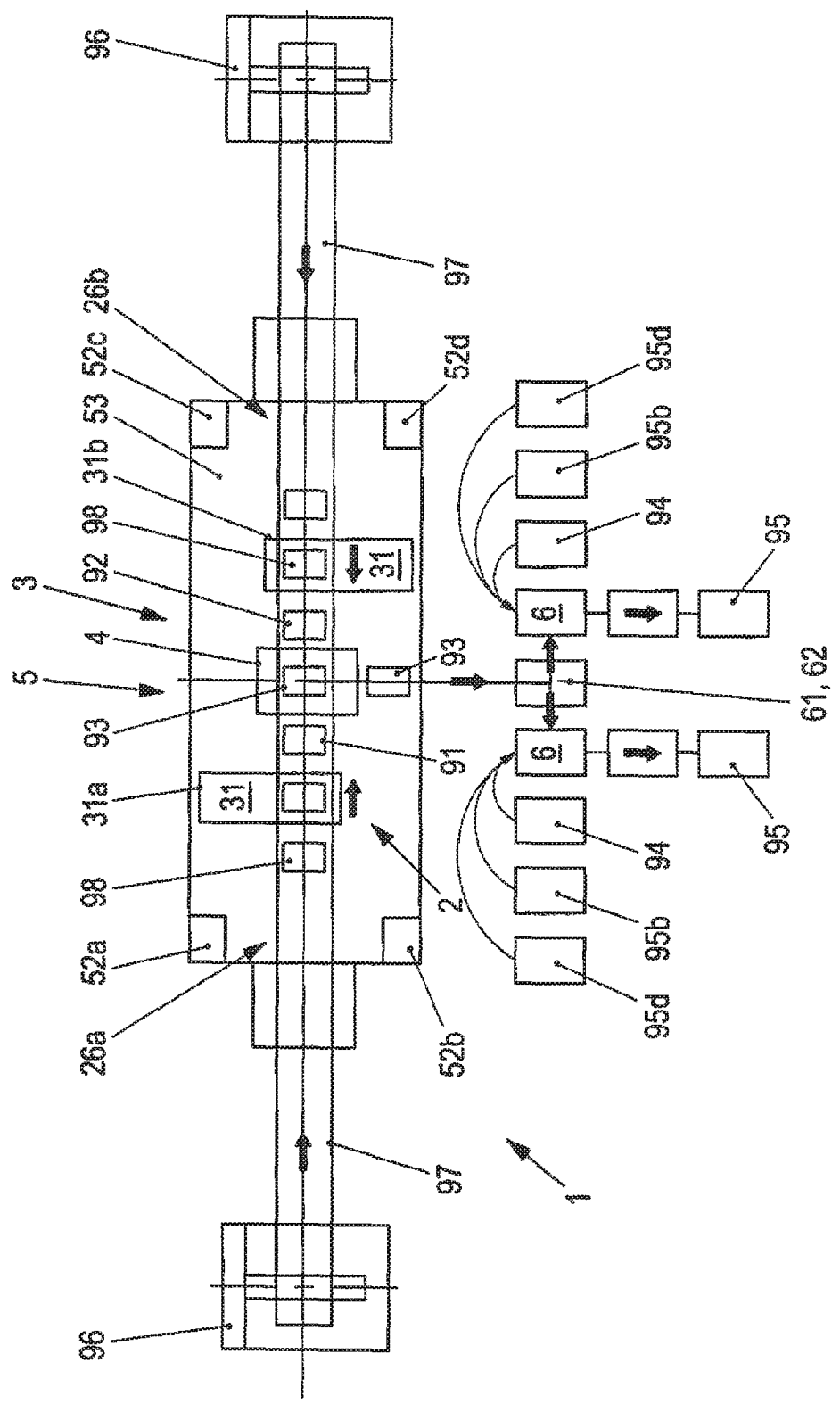
FIG. 3: a further embodiment example of the invention with substrate feed from both sides.

FIG. 3 shows a further embodiment example of the device 1 for producing bipolar plates. In contrast to the designs represented before, in this embodiment example the conveying device 2 comprises two transport belts 96*a* and 96*b*, driven in opposite directions, which effect the transport of the plates, i.e. of the substrate plates 98 and also of the anode plates 91 and cathode plates 92. As in the embodiment example represented in FIG. 1, here too the press line 5 is loaded with substrate material 97 from both sides by means of two roll magazines 96. The transport belt 96*a* represented in the upper area in FIG. 3 transports substrate plates 98 or anode plates 91 to the joining device 3 in the transport direction. The transport belt 96*b* represented in the lower area in FIG. 3 transports substrate plates 98 and cathode plates 92 to the joining device 4 against the transport direction. The joining device 4 again connects an anode plate 91 to a cathode plate 92 to form a bipolar plate 93. The bipolar plate 93 is transported sideways, as represented by the direction of the arrow in FIG. 3, to a deflector 61 which serves two stacking devices 6. The stacking devices are constructed identically and arranged as in the embodiment example shown in FIG. 1.

FIG. 7 shows a further embodiment example of the device 1 for producing bipolar plates. Here too, the substrate material 97 is fed from both sides, thus from opposite sides. The anode plates 91 and cathode plates 92 are also conveyed in opposite directions. This embodiment largely corresponds to the embodiments described above. In contrast to the designs represented before, the conveying device 2 has a roller transport device, in order to convey the substrate strip 97. The substrate strip is guided between two rollers of the conveying device 2 and conveyed by rotating the rollers. The forming dies, thus the anode die 31*a* and the cathode die 31*b*, have an integrated separator 41. This means that from the conveyed substrate strip, in one working step, anode plates 91 are formed by means of the anode die 31*a* and cathode plates 92 are formed by means of the cathode die 31*b* and simultaneously cut off from the substrate strip 97 as far as residual webs. Through these residual webs the anode plates 91 and the cathode plates 92 remain still connected to the substrate strip 97. It is thus possible through the feed of the substrate strip 97 via the conveying device 2 to convey several of the connected anode plates 91 together, or to convey several of the connected cathode plates 92. In the joining device 4 the residual webs are severed, i.e. the anode plates 91 or cathode plates 92 are completely cut off from the substrate strip 97 and then joined to each other to form a bipolar plate 93. The bipolar plate 93 is then transported away from the joining device 4 and, in the same way as described in the above designs, processed further by means of the stacking device 6 to form a bipolar plate stack 95.

Figure 6:
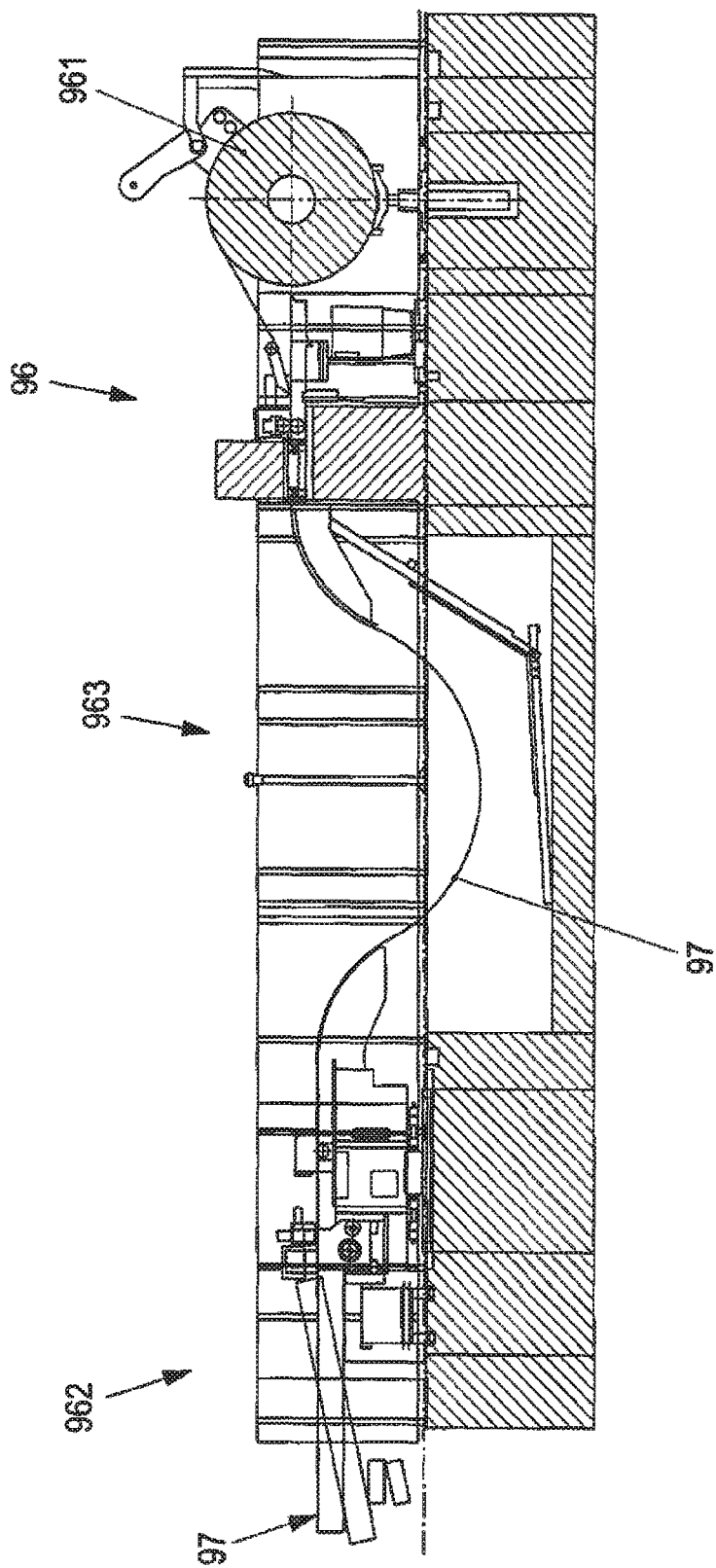
FIG. 6: an embodiment example of a substrate magazine.

FIG. 6 shows an embodiment example of a substrate magazine 96 which serves to feed substrate strip 97. The substrate magazine comprises a mounting to secure a reel 961 with substrate sheet. The substrate sheet 97 is unwound from the reel 961 and fed via a buffer 963 to a straightening device. The straightening device 962 comprises a transport device for transporting the substrate strip 97, and shears. The transport device transports the transport belt towards the conveying device 2. In the representation of FIG. 6, the conveying device 2 is not shown; it is attached to the substrate magazine 96 on the left-hand side. The shears serve to clean up edges of the substrate strip 97. The substrate strip 97 supplied as a coil or reel 961 often has transport damage in the edge area. These edges are cut off or cleaned up using the shears.

The buffer 963 serves as material buffer, in order to even out the irregular feed of the transport device. The substrate strip is unwound from the reel 961 continuously. However, the transport device does not transfer the substrate strip continuously, but cyclically, to the conveying device 2, according to the cycle thereof. Nevertheless in order to make it possible to unwind the strip continuously, the buffer 963 is provided. The substrate strip 97 in this area sags to a greater or lesser extent and forms a substrate strip reserve which evens out the strip tension of the substrate strip 97.

In the embodiment examples shown, it is essential that substrate strips that have already been coated are used as substrate material 97. In all the designs shown this means that a subsequent coating of the formed substrate plates is not necessary. This means that the complex coating methods, as are known from the state of the art and necessary, can be dispensed with.

To remove any contaminants from the plates between the individual processing stations, it can be provided that the pressing device 5 has cleaning means, for example in the form of compressed-air jets or brushes, in order to clean the plates, i.e. the substrate plates 98 and/or the anode plates 91 and/or the cathode plates 92 and/or the bipolar plates 93. The cleaning can be effected by blowing off using compressed air or brushing off. It can be provided that the compressed-air jets or the brushes are secured stationary on the pressing device 5 and the cleaning is effected during transport of the plates by means of the conveying device, in that the conveying device 2 conveys the plates 98, 91, 92, 93 past a compressed-air jet or a brush.

Figure 4:
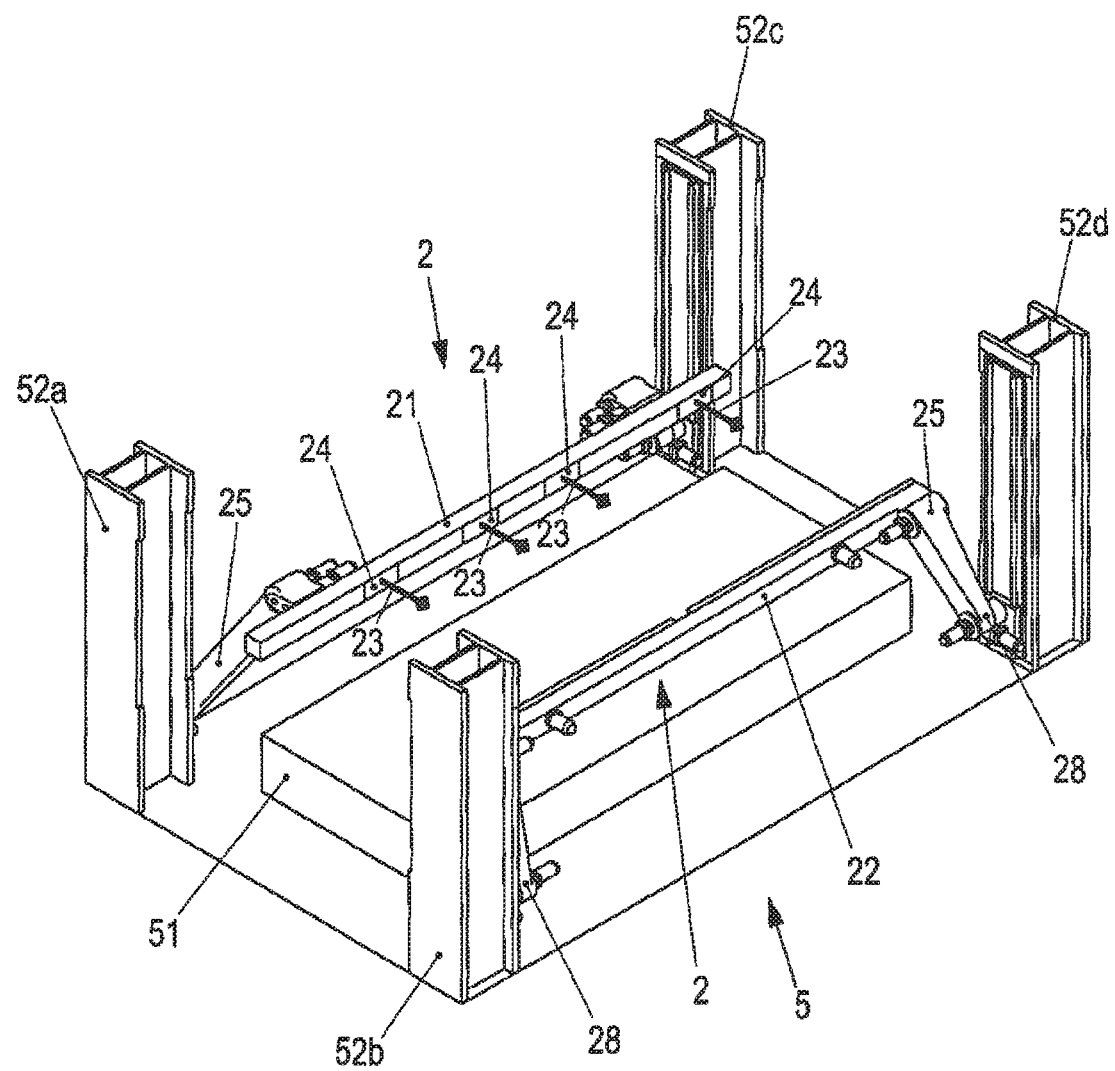
FIG. 4: an example of a forming device for the production of bipolar plates.

FIG. 4 shows an enlarged representation of the pressing device 5 with a conveying device 2. The conveying device 2 has two transport beams 21 and 22. Each transport beam 21 or 22 is mounted in the area of its end on a vertical press upright 52a, 52b, 52c, 52d by means of a rocker arm 28 and a lifting carriage 27. The lifting carriage 27 has a vertical drive in order to move the transport beam 21 or 22 in the lifting direction.

Several transport carriages 24 are arranged on each transport beam 21 or 22. The transport carriages 24 can be moved relative to the supporting beam 21 or 22. For this the transport carriages 24 each have a drive device with its own drive motor. The drive motor can be formed as an electric linear motor and can move the transport carriage by means of magnetic interaction with a stator of the supporting beam 21 or 22. Alternatively, the drive motor can also be formed as a servo motor, which moves the transport carriage 24 by means of a gear wheel and engagement with a gear rack. Each transport carriage is independently actuatable via a control device. In each case a die gripper 23 is removably secured on each transport carriage 24. The control device is also connected to each die gripper 23 in order to be able to actuate it individually with the aim of being able to receive or deposit individual plates 98, 91, 92, 93 selectively.

Figure 5:
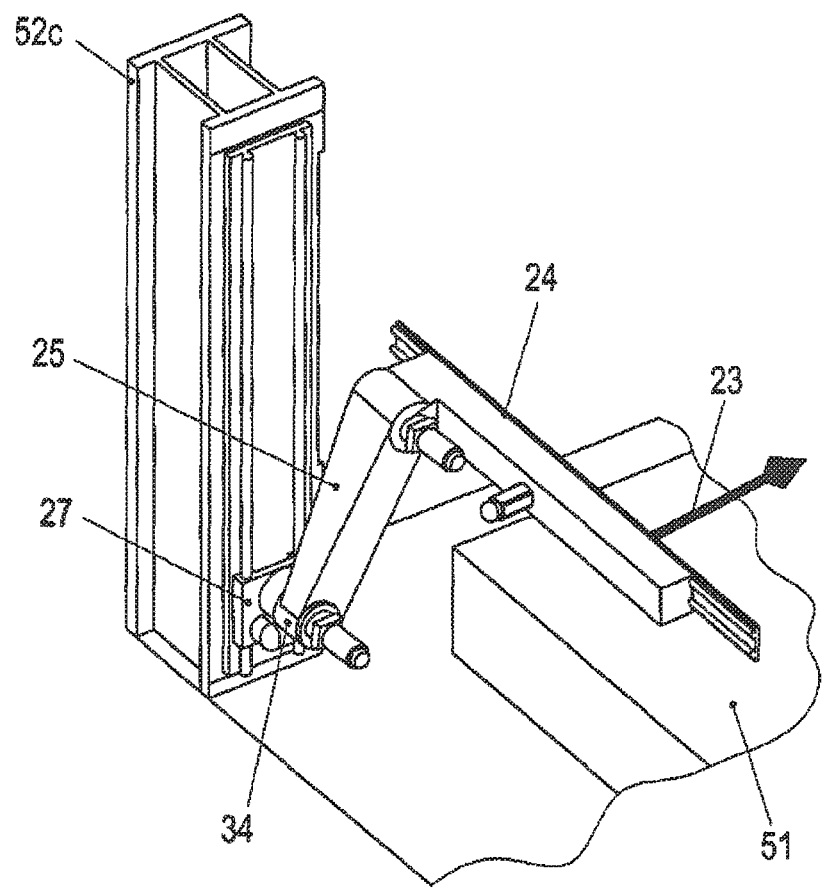
FIG. 5: a detail enlargement from FIG. 4 in the area of a press upright.

A rocker arm 25 is pivoted on each lifting carriage 27. At its end connected to the lifting carriage 27, the rocker arm has a rotary drive 28 by means of which the rocker arm 25 can be rotated. At its other end, the rocker arm 25 has a pivot bearing which, for example, has a parallelogram linkage or a further rotary drive in order to keep the vertical or horizontal alignment of the connected transport beam 21, 22 the same when the rocker arm 25 is rotated (FIG. 5). A clamping movement, i.e. a movement transverse to the workpiece transport direction, can be effected by a combined actuation of the rotary drive 28 and of the lifting drive of the lifting carriage 27. The rocker arm 25 is rotated via the rotary drive 28. Through the rotational movement, the supporting beam 21 or 22 experiences a first movement component transverse to the transport direction, i.e. in or against the desired clamping direction, and a second movement component in the vertical direction. The movement component in the vertical direction is compensated for by actuation of the lifting carriage 27 in the opposite direction, with the result that the height of the supporting beam 21 or 22 remains unchanged. In this way it is possible to perform a linear horizontal movement in or against the clamping direction with the supporting rails 21 and 22 pivoted via the rocker arm 25, without a height variation resulting.

LIST OF REFERENCE NUMBERS 1 device for producing bipolar plates
2 conveying device
21 first transport beam
22 second transport beam
23 workpiece gripper
24 transport carriage
25 rocker arm
26a first transport belt
26b second transport belt
27 lifting carriage
28 rotary drive
3 forming device
31 stamping die
31a anode die
31b cathode die
4 joining device
41 separator
5 pressing device
51 bolster plate
52a vertical press upright
52b vertical press upright
52c vertical press upright
52d vertical press upright
53 clamping box
6 stacking device
61 deflector
66 transverse transport belt
91 anode plate
92 cathode plate
93 bipolar plate
94 membrane
95 stack/bipolar plate stack
95d cover plate
95b base plate
96 substrate magazine
961 reel/coil
962 straightening device
963 strip buffer
97 substrate strip
98 substrate plate

The invention claimed is:
1. A device for producing bipolar plates for fuel cells, comprising a conveying device, a forming device and a joining device, wherein the conveying device transports substrate plates, automatically driven, in a transport direction first to the forming device and then to the joining device,
wherein the forming device is configured to stamp structures into the substrate plates by means of at least one stamping die or at least one forming die and thereby forms a substrate plate into an anode plate or a cathode plate, and wherein the joining device is configured to join an anode plate and a cathode plate to form a bipolar plate, and wherein the conveying device has a transport beam with at least one workpiece gripper for gripping substrate plates and/or anode plates and/or cathode plates, wherein the transport beam extends from the forming device to the joining device, and a conveying drive device is connected to the transport beam and configured to move the workpiece gripper and/or the transport beam, automatically driven, in or against the transport direction, and to move the workpiece gripper and/or the transport beam, automatically driven, in a lifting direction and/or in a clamping direction.

2. The device for producing bipolar plates according to claim 1, wherein the forming device is formed as part of a pressing device, wherein it is provided that the pressing device has vertical press uprights and a bolster plate arranged between the press uprights, and the transport beam runs parallel to a long side of the bolster plate.

3. The device for producing bipolar plates according to claim 1, wherein the conveying device has at least two transport beams running parallel to each other in the transport direction, wherein each transport beam has at least one workpiece gripper for gripping substrate plates and/or anode plates and/or cathode plates.

4. The device for producing bipolar plates according to claim 1, wherein, the transport beam is mounted at or on a clamping box, wherein the clamping box has a lifting drive in order to drive the transport beam in a lifting direction and/or has a clamping drive in order to drive the transport beam in a clamping direction and/or has a longitudinal drive in order to drive the transport beam in the transport direction.

5. The device for producing bipolar plates according to claim 1, wherein, the transport beam is mounted in the area of its ends on a vertical press upright via a lifting carriage driven by a lifting drive so as to be slidable in the vertical direction, and the lifting carriage pivots an end of a rocker arm the other end of which is connected to the transport beam.

6. The device for producing bipolar plates according to claim 1, wherein the workpiece grippers are removably secured on the transport beam or a transport carriage of the transport beam.

7. The device for producing bipolar plates according to claim 1, wherein at least two movable transport carriages are mounted on a transport beam, wherein each of these two transport carriages secures a workpiece gripper and has its own drive device in order to move this transport carriage, independently of other transport carriages, along the transport beam.

8. The device for producing bipolar plates according to claim 1, wherein a workpiece gripper is movably mounted on a transport carriage, driven in the lifting direction, wherein the transport carriage has a vertical drive for raising and/or lowering the workpiece gripper.

9. The device for producing bipolar plates according to claim 1, wherein the conveying device has a conveying control device or is connected to a conveying control device, wherein the conveying control device controls the transport beam and/or a workpiece gripper and wherein the conveying control device determines a movement profile of the transport beam and/or of a workpiece gripper.

10. The device for producing bipolar plates according to claim 1, wherein the drive device of the transport carriages is connected to a carriage control device and the carriage control device is formed to actuate an individual transport carriage and/or an individual workpiece gripper.

11. A device for producing bipolar plates for fuel cells, comprising a conveying device, a forming device and a joining device, wherein the conveying device transports either individual substrate plates, or several substrate plates connected to one another, automatically driven, in a transport direction first to the forming device and then to the joining device, wherein the forming device is configured to stamp structures into the substrate plates by means of a stamping die or forming die and thereby forms a substrate plate into an anode plate or a cathode plate, and wherein the joining device is configured to join an anode plate and a cathode plate to form a bipolar plate, and wherein the forming device has, as a first stamping die or forming die, at least one anode die for forming anode plates and has, spaced apart therefrom in the transport direction, as a further stamping die or forming die, at least one cathode die for forming cathode plates, and the joining device is arranged between the anode die and the cathode die, and wherein the conveying device is configured to move the anode plates and cathode plates in the opposite direction to each other in the transport direction and in each case transports an anode plate and a cathode plate to the joining device.

12. The device for producing bipolar plates according to claim 11, wherein the conveying device has a roller transport device or an eddy current transport device for transporting substrate material and/or substrate plates and/or anode plates and/or cathode plates.

13. The device for producing bipolar plates according to claim 11, wherein the conveying device has two transport belts which are in each case guided over two deflection rollers and driven in opposite directions, wherein one of the transport belts transports the anode plates and the other of the transport belts transports the cathode plates.

14. The device for producing bipolar plates according to claim 13, wherein the conveying device has a transport beam with at least one die gripper for gripping substrate plates and/or anode plates and/or cathode plates, wherein the transport beam extends from the anode die to the cathode die and has a conveying drive in order to move the transport beam and/or the workpiece gripper, automatically driven, in or against the transport direction, and to move the workpiece gripper and/or the transport beam, automatically driven, in a lifting direction and/or in a clamping direction.

15. The device for producing bipolar plates according to claim 11, wherein, the forming device is formed as part of a pressing device, wherein the pressing device has vertical press uprights and a bolster plate, and the transport beam runs parallel to a long side of the bolster plate.

16. The device for producing bipolar plates according to claim 11, wherein
the pressing device has a first press ram which interacts with the anode die and has a second press ram which interacts with the cathode die.

17. The device for producing bipolar plates according to claim 11, wherein
the conveying control device actuates the conveying device with a movement profile such that the conveying device, in the area of the joining device, places a cathode plate on an anode plate or places an anode plate on a cathode plate by actuating the transport beam and/or a workpiece gripper such that the latter first inserts a cathode plate or an anode plate into a holder of the joining device and then an anode plate or a cathode plate is raised in the lifting direction by the transport beam and/or a further workpiece gripper, moved to at least partially overlap the inserted cathode plate or anode plate and positioned on the inserted cathode plate or anode plate by lowering the transport beam and/or the further workpiece gripper.

18. The device for producing bipolar plates according to claim 11, wherein
the joining device is a laser welding device or an electrode welding device or a plasma welding device.

19. A device for producing bipolar plate stacks, comprising a device for producing bipolar plates according to claim 11, wherein
the joining device transfers a bipolar plate to a further transport device, which conveys the bipolar plate transverse to the transport direction and feeds it to a stacking device.

20. The device for producing bipolar plate stacks according to claim 19, wherein
the further transport device has a transverse transport belt which is guided rotating via two deflection rollers.

21. The device for producing bipolar plate stacks according to claim 19, wherein
the further transport device has a driven conveyor arm with a workpiece gripper.

22. The device for producing bipolar plate stacks according to claim 19, wherein
the stacking device alternately stacks a bipolar plate and a membrane on a fuel cell stack and forms two fuel cell stacks, wherein the stacking device has a deflector in order to feed a bipolar plate to either a first fuel cell stack or a second fuel cell stack.

23. The device for producing bipolar plate stacks according to claim 22, wherein
the deflector is arranged at the side next to the conveying device at the level of the joining device.

24. The device for producing bipolar plate stacks according to claim 22, wherein
the first fuel cell stack is arranged at the side next to the conveying device at the level of the anode die and the second fuel cell stack is arranged at the side next to the conveying device at the level of the cathode die.

25. The device for producing bipolar plates according to claim 11, wherein
two roll magazines with substrate rolls are arranged in front of and behind the conveying device in the transport direction, wherein the first roll magazine supplies substrate strip to the conveying device in the transport direction, and the second roll magazine supplies substrate strip to the conveying device against the transport direction.

26. The device for producing bipolar plates according to claim 25,
wherein the substrate strips are formed as metal strips which have a reactive coating and/or a catalyst coating.

27. The device for producing bipolar plates or bipolar plates according to claim 25,
wherein a separator which cuts individual substrate plates off from the substrate strip is provided in a transfer area between substrate strip and the conveying device.

* * * * *